(12) United States Patent
Clark

(10) Patent No.: US 8,739,508 B1
(45) Date of Patent: Jun. 3, 2014

(54) SHOCK CANCELLATION MECHANISM FOR THE CONTROL OF UNSTEADY INTERACTION IN CONTRA-ROTATING HIGH- AND LOW-PRESSURE TURBINES

(75) Inventor: John P. Clark, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1181 days.

(21) Appl. No.: 12/569,015

(22) Filed: Sep. 29, 2009

(51) Int. Cl.
*F02C 3/067* (2006.01)
*F01D 5/18* (2006.01)

(52) U.S. Cl.
USPC .................... 60/39.162; 60/806; 60/39.091

(58) Field of Classification Search
USPC ........ 60/39.15, 791, 39.162, 39.17, 782, 785, 60/39.091, 779, 784, 806; 415/115, 119; 416/96 R, 97 R, 97 A, 96 A
See application file for complete search history.

(56) References Cited

U.S. PATENT DOCUMENTS

| 7,377,743 B2 * | 5/2008 | Flodman et al. ............... 415/115 |
| 2006/0073016 A1 * | 4/2006 | Liang ........................... 416/97 R |
| 2007/0157596 A1 * | 7/2007 | Moniz ......................... 60/39.162 |

* cited by examiner

*Primary Examiner* — Andrew Nguyen
(74) *Attorney, Agent, or Firm* — AFMCLO/JAZ; Fredric Sinder

(57) ABSTRACT

In a high pressure turbine used in combination with a contra-rotating low pressure turbine, in which the geometry of the inlet guide vane of the low pressure turbine induces a reflection of the incident shock wave from the high pressure turbine airfoil that propagates back upstream to impact the blade thereby denigrating both the performance of the high pressure turbine and its durability. The shock wave reflection is eliminated by fitting the downstream vanes with holes or indentations that allow jets of compressor bleed air to penetrate the boundary layer and induce a net velocity component across the main-flow direction in the near-wall region. This induced flow component acts to cancel the net flow component created by the moving shock from the upstream blade row thereby obviating the reflection that occurs naturally to cancel the flow.

11 Claims, 2 Drawing Sheets

SHOCK CANCELLATION MECHANISM FOR THE CONTROL OF UNSTEADY INTERACTION IN CONTRA-ROTATING HIGH- AND LOW-PRESSURE TURBINES

RIGHTS OF THE GOVERNMENT

The invention described herein may be manufactured and used by or for the Government of the United States for all governmental purposes without the payment of any royalty.

BACKGROUND OF THE INVENTION

This invention relates to the attenuation of reflected shock waves from a low pressure turbine vane component of a gas turbine engine.

Acoustic and shock waves are traveling pressure fluctuations which cause local compression of the material through which they move. Acoustic waves cause disturbances whose gradients, or rates of displacement are small—on the scale of the displacement itself. Acoustic waves travel at a speed determined by and characteristic of a given medium; thus, one must speak of the speed of sound, or acoustic speed in that medium. An acoustic wave regardless of its frequency (pitch) or amplitude (loudness) will always travel at the same speed in a given substance.

Shock waves are distinguished from acoustic waves in two key respects. First, shock waves travel faster than the speed of sound in any medium. Secondly, local displacements of atoms or molecules comprising a medium caused by shock waves are much larger than for acoustic waves. Together, these two factors produce gradients or rates of their displacement much larger than the local fluctuations themselves.

Energy is required to produce pressure waves. This is related to the equation that states that energy equals force multiplied by the displacement caused by the force. Once the driving source ceases to produce pressure disturbances, the waves decay. Attenuation involves acceleration of the natural damping process, which therefore means removing energy from pressure waves.

All matter through which pressure waves travel naturally attenuates these waves by virtue of their inherent mass. Materials possess different acoustic attenuating properties, strongly affected by density and by the presence or absence of phase boundaries and structural discontinuities. Porous solid materials, thus, are better attenuators of sound waves than perfect crystalline solids. Gases are inherently poor pressure wave attenuators.

All types of pressure waves can be reflected and diffracted by liquid and gas media. They can also be deflected or, more generally, scattered and dispersed by phase boundaries, such as liquid droplets or solid particulates suspended in air. These deflections serve to increase the distance which the wave travels. Scattering and dispersion thus produce more attenuation because they cause the transmitting pressure waves to displace more mass by virtue of the longer path. Such deflections also reduce, or may altogether eliminate the pressure waves originally traveling in a specific direction.

Acoustic Wave Attenuation

Documented efforts to reduce noise (attenuate acoustic waves) in enclosed spaces extend to the early nineteenth century. Virtually all acoustic wave attenuation concepts have been based upon layers of solid materials with significant sound absorbing properties serving as linings, coatings, or loosely-packed fibrous or granular fillers between solid layers. These sound-absorptive layers have been applied to or incorporated within structural walls, floors, ceilings, and other types of panels and partitions when acoustic attenuation is required. Several dozen patents have been granted in the United States alone which fall into this category.

In 1910, Mallock introduced the idea of using aqueous foams for noise suppression, and conducted experimental evaluation of foams in this role. See Mallock, A., "The damping of sound by frothy liquids", Proc. Royal Soc. A84; pp. 391-5, 1910. Aqueous foams are agglomerations of bubbles, with the gas phase within each bubble completely separated from that in adjacent bubbles by aqueous liquid film comprising the bubble walls. During the years following Mallock's research, aqueous foams became widely used for fire suppression, in numerous chemical processes, and for mineral ore separation.

Not until the 1960's did interest renew in using aqueous foams for pressure wave attenuation. Research from that time and continuing to the present extended to their use for suppressing jet engine noise and acoustic disturbances arising from artillery muzzle blast, ordnance disposal, and "sonic boom" created by supersonic aircraft flight. It was during this time that researchers discovered that aqueous foams dramatically attenuate impinging shock waves.

Shock Wave Attenuation

Much more energy is required to produce shock waves compared to acoustic disturbances, which makes their attenuation more difficult. Shock waves decay to form acoustic waves when the source of the shock wave is removed or suppressed.

When traveling through gases, shock waves produce increases in pressure (often referred to as "overpressure") and temperature; they also accelerate gas molecules and entrained particulates in the direction of shock wave travel. Shock waves produced by combustion processes, such as explosions and deflagrations, release substantial amounts of thermal and radiant energy as well. For all shock waves, the shock wave speed, overpressure, and temperature increase they induce in the local medium are mathematically linked. Attenuation of shock waves is thus achieved through directly suppressing one of these three parameters; if temperature is reduced, the overpressure and shock speed are accordingly reduced, for example.

In a high pressure turbine that is used in combination with a contra-rotating low pressure turbine, the geometry of the inlet guide vane of the low pressure turbine induces a reflection of the incident shock wave from the high pressure turbine airfoil that propagates back upstream to impact the blade. In consequence, both the performance of the high pressure turbine and its resistance to high cycle fatigue failure, i.e., its durability, is improved.

At the time of the present invention, there was no known way of accurately predicting, reducing, or eliminating this shock reflection and its attendant effects on blade vibration. The prior art reflects a solution that includes inserting a larger number of downstream low pressure turbine vanes to a level sufficient to ensure that no resonance occurs in the upstream blade row over the entire operating range of the engine. This solution necessarily leads to increased numbers of parts resulting in increased engine weight, and increased life-cycle costs over what is achieved based on the aerodynamic loading constraints of the low pressure turbine vane row of the present invention.

The use of steady jets of compressor bleed air to eliminate shock reflections in vaned contra-rotating turbines does not exist in the prior art. The present invention has distinct advantages over the current method of resonant frequency control via large airfoil count. It results in a much lighter, lower cost embodiment of the low pressure turbine vane row than was achievable in the prior art. The present invention is similar to steady film cooling, but the jet velocities are designed to cancel the incident shock from the upstream vane row instead of to provide heat-transfer management as in the case of film cooling.

SUMMARY OF THE INVENTION

In view of the shortcomings for existing apparatus and assemblies to attenuate acoustic and/or shock waves as noted above, there has been found to remain a need for an improved assembly for more effectively attenuating acoustic and/or shock waves. The present invention accordingly provides a means for attenuating substantially all types of pressure waves, existing as either an acoustic or shock wave, in generally all gaseous environments, particularly in a counter-rotating gas turbine.

The shock reflection in a contra-rotating turbine is eliminated as follows: The high pressure side of the downstream vane is fitted with holes or indentations that allow jets of compressor bleed air to penetrate the boundary layer and induce a net velocity component across the main-flow direction in the near-wall region. A moving shock wave generates a small velocity component in the direction of travel. Usually such an incident shock is reflected from solid boundaries and in so doing the reflected shock induces a velocity component equal and opposite to that generated by the moving shock in the near-wall region of the low pressure turbine vane. Here steady blowing is defined to produce the near-wall flow, and as a consequence the physical basis of the shock reflection is itself cancelled. This eliminates the shock reflection that ordinarily travels back upstream to impact the rotating blade row.

The use of steady jets of compressor bleed air to eliminate shock reflections in vaned contra-rotating turbines does not exist in the prior art. The present invention has distinct advantages over the current method of resonant frequency control via large airfoil count. It results in a much lighter, lower cost embodiment of the low pressure turbine vane row than was achievable in the prior art. The present invention is similar to steady film cooling, but the jet velocities are designed to cancel the incident shock from the upstream vane row instead of to provide heat-transfer management as in the case of film cooling.

The present invention can be used to reduce unsteady interactions in all commercial gas turbine engines (land, sea, and air applications) with vaned contra-rotating geometries including, for example, the General Electric CFM56 class of engines and the Pratt & Whitney PW6000 class of engines.

DETAILED DESCRIPTION

Figure 1:
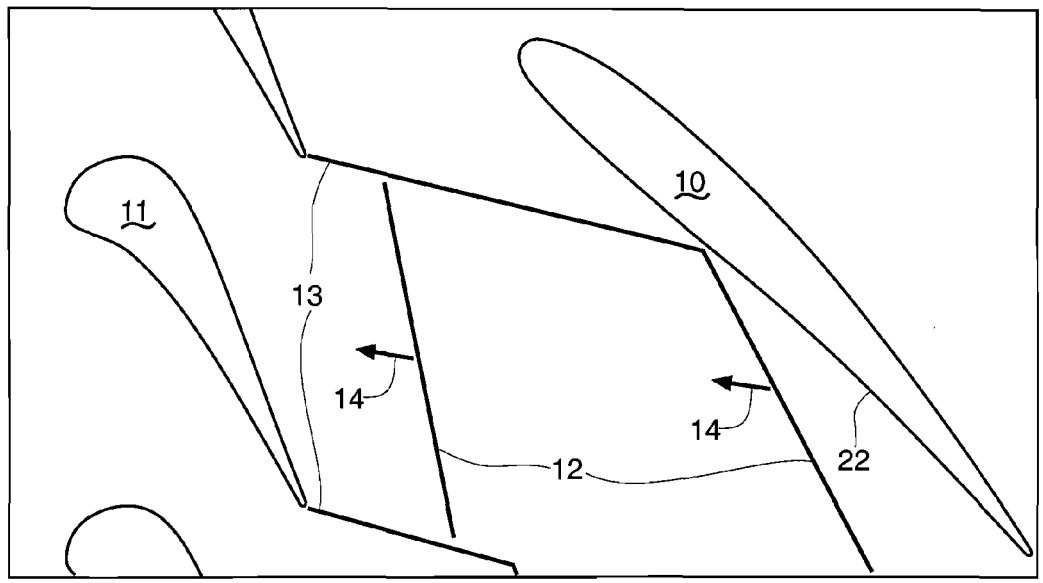
FIG. 1 shows a prior art turbine with incident shock waves from a high pressure turbine blade being reflected off a downstream low pressure turbine vane and propagated back upstream to the blade row.

In a prior art FIG. 1 high pressure turbine that is used in combination with a contra-rotating low pressure turbine, the geometry of an inlet guide vane 10 of a low pressure turbine blade induces a reflection 12 of incident shock waves 13 from a high pressure turbine blade 11 that propagates back upstream in the direction of arrows 14 to impact a blade 11. As a consequence, both the performance of the high pressure turbine blade 11 and its resistance to high cycle fatigue failure (i.e. its durability) can be adversely affected.

Figure 2:
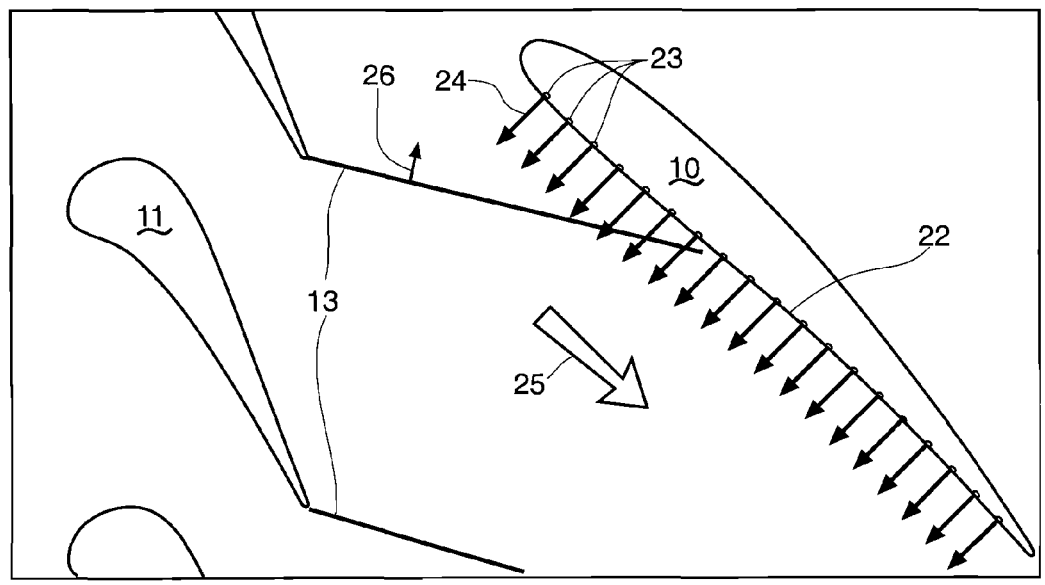
FIG. 2 shows incident shock waves being attenuated. The addition of indentations results in small jets of compressor-bleed air emanating from the low pressure turbine blade surface canceling the incident shock waves.
Figure 3:
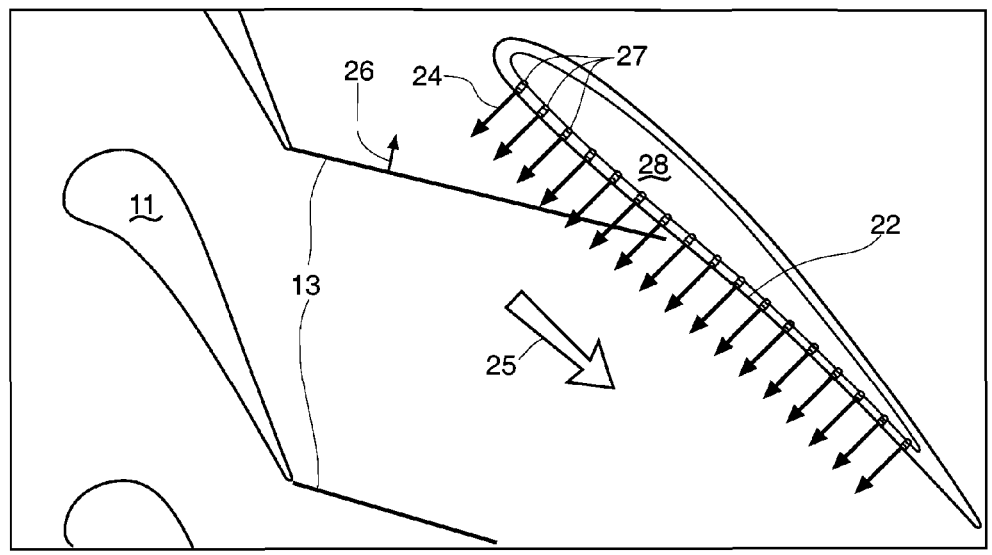
FIG. 3 shows incident shock waves being attenuated. The addition of holes results in small jets of compressor-bleed air emanating from the low pressure turbine blade surface canceling the incident shock waves.

The present invention eliminates this problem of shock reflection 12. In FIGS. 2 and 3 the pressure side 22 of the downstream vanes is fitted with holes 27 or indentations 23 that allow jets of compressor bleed air to penetrate the boundary layer along the pressure side 22 and induce a resulting velocity component 24 across the direction of main-flow 25. The indentations 23 are of a depth and diameter determined by the particular turbine and experimentation. Alternatively, as seen in FIG. 3, holes 27 may penetrate vanes 10 from the pressure side 22 to the hollowed interior 28 through which vane cooling gases pass.

It is well known that a moving shock wave 13 like that extending downstream from the rotating blade induces a small velocity component 26 normal to the shock and essentially parallel to its direction of travel. The moving shock wave must reflect from stationary solid boundaries it impacts in order to maintain a no-slip, zero velocity, condition at the surface of any stationary components.

By inducing a velocity component equal and opposite to that generated by the moving shock 13 in the near-wall region of the low pressure turbine vane 22, the incident shock 13 can be cancelled. This eliminates the shock reflection that would otherwise travel back upstream to impact the rotating blade row.

What is claimed is:

1. A gas turbine engine, comprising;
   (a) high pressure turbine blades;
   (b) contra-rotating low pressure turbine vanes downstream from the high pressure turbine blades;
   (c) means for inducing a component of gas velocity, which penetrates a boundary layer along a high pressure surface of the low pressure turbine vanes equal and opposite to a velocity component of a shock wave from the high pressure turbine blades.

2. The gas turbine engine of claim 1, wherein the means for inducing a component of gas velocity comprises a series of irregularities along the high pressure surface of the vanes.

3. The gas turbine engine of claim 2, wherein the series of irregularities comprise a series of holes in the high pressure surface of the vanes.

4. The gas turbine of claim 3, wherein the holes penetrate the high pressure sides of the vanes to a hollow interior of the vanes, allowing compressor bleed air to escape the interiors of the vanes.

5. The gas turbine engine of claim 2 wherein the series of irregularities comprise a series of indentations in the high pressure surface of the vane.

6. A gas turbine engine, comprising a high pressure turbine blade in combination with a contra-rotating low pressure turbine vane having a series of irregularities along the high pressure surface of the vane; the irregularities configured to induce a component of gas velocity, which penetrates a boundary layer along a high pressure surface of the low pressure turbine vane, equal and opposite to a velocity component of a shock wave from the high pressure turbine blade.

7. The gas turbine engine of claim 6, wherein the series of irregularities comprise a series of holes in the high pressure surface of the vane.

8. The gas turbine of claim 7, wherein the holes penetrate the high pressure side of the vane to a hollow interior of the vane.

9. The gas turbine engine of claim 6 wherein the series of irregularities comprise a series of indentations in the high pressure surface of the vane.

10. The gas turbine engine of claim 2 wherein the series of irregularities comprise a series of slots in the high pressure surface of the vane.

11. The gas turbine of claim 10 wherein the slots penetrate the high pressure side of the vane to a hollow interior of the vane allowing compressor bleed air to escape the interior of the vane.

\* \* \* \* \*